PULSE FORMER WITH CAPACITOR DISCHARGING PROVIDING RAPID RISE-TIME AND THYRATRON SHORTING OUTPUT PROVIDING RAPID FALL-TIME
Filed Aug. 21, 1961
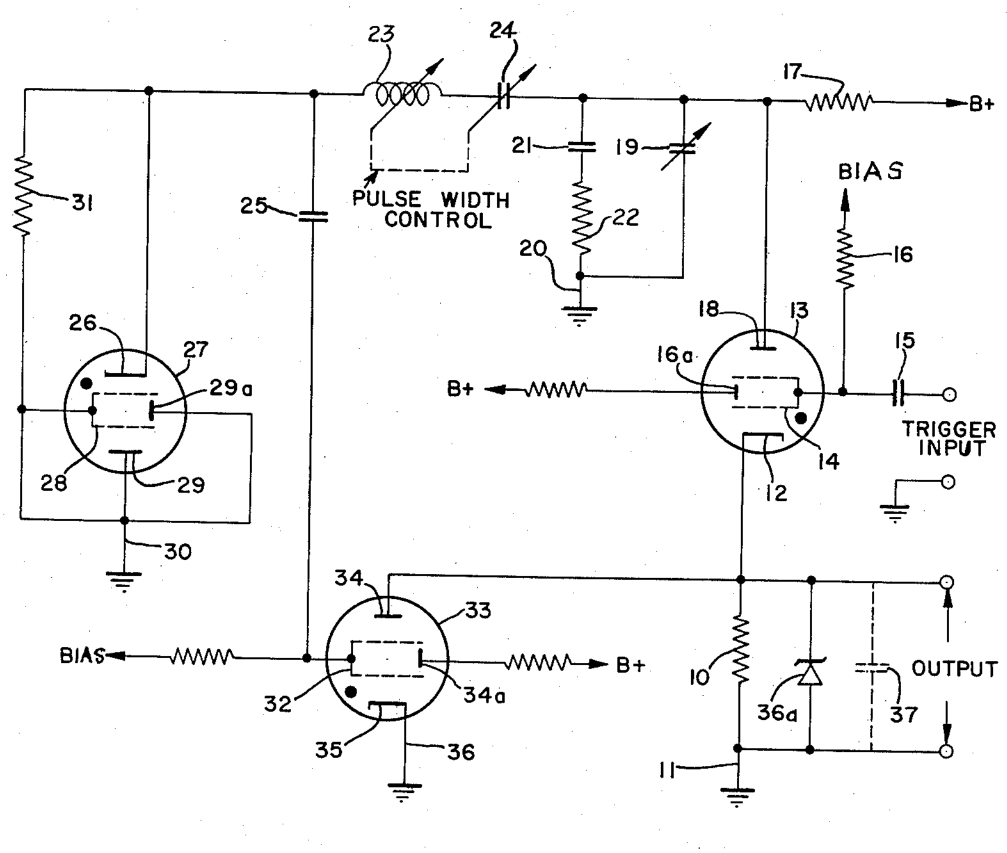
JOHN J. HICKEY
GEORGE L. CLARK
INVENTORS.
BY Gerald Grigg
George C. Thompson
AGENTS.

United States Patent Office 3,100,872

Patented Aug. 13, 1963

3,100,872

PULSE FORMER WITH CAPACITOR DISCHARGING PROVIDING RAPID RISE-TIME AND THYRATRON SHORTING OUTPUT PROVIDING RAPID FALL-TIME

John J. Hickey and George L. Clark, Hawthorne, Calif., assignors to Space Technology Laboratories, Inc., Los Angeles, Calif., a corporation of Delaware Filed Aug. 21, 1961, Ser. No. 132,795
13 Claims. (Cl. 328—67)

This invention relates generally to pulse forming circuits and more particularly to a circuit for generating a substantially high voltage pulse having a low impedance trailing and leading edge independent of the length of the pulse.

This invention discloses a circuit for producing pulses having amplitudes of at least 300 volts and having a rise and fall time that is independent of pulse width. For example, 400 volt pulses have been generated having a rise time of five (5) nanoseconds ($5\times10^{-9}$ seconds) and a pulse duration of 10 miscroseconds; the ratio of rise time to pulse width being .05 percent as compared to present day techniques capable of producing a rise time to pulse width ratio of only 1 percent. The advantages of this invention are therefore more apparent when applied to pulses having a length greater than ½ microsecond.

In this invention there is disclosed an output and a first low impedance switching means in the form of a first thyratron adapted to be triggered by an input signal. The firing of the first thyratron generates a leading edge of an output signal. Connected across the output is a clipping diode such as a Zener diode for clipping the output signal to a desired voltage level. A first energy storage means having a substantially low time constant is connected in series with the first low impedance switching means and across the output and is arranged to sustain a first portion of the output signal at the clipped value by discharging its stored energy into the clipping diode and the external load impedance. A second energy storage means having in conjunction with a series resistor a substantially longer time constant than said first energy storage means. The second energy storage means is connected in series with the first low impedance switching means and across the output, and is arranged to sustain a second portion of the output signal at the clipped value by discharging the stored energy through the clipping diode and the external load impedance. In the preferred embodiment the first and second energy storage means are capacitors that are charged to a voltage substantially higher than the clipped output signal. The time duration of the output signal is controlled by a delay generator responsive to the input trigger. The delay generator may consist in part of a series resonant LC circuit in which the series capacitor is charged to a substantially higher voltage than said clipped output signal. The pulse width is then determined by the duration of the positive going first half cycle of the oscillation of the LC resonant circuit. The first current reversal of the oscillation is detected and used to generate a terminating signal. This terminating signal controls a second low impedance switching circuit such as a second thyratron connected across the clipping diode for shunting the output, cutting off said output signal and thereby producing a steep trailing edge.

Further advantages of this invention will be made more apparent by referring now to the accompanying drawing where there is shown a schematic diagram illustrating an embodiment of the present invention for generating a 400 volt signal, 10 microseconds long and a rise and fall time of 10 nanoseconds. The normal 2D21 thyratrons used and disclosed in this invention are not connected in the normal and accepted manner. For example, the screen grid is used as a control grid and the normal control grid is connected to a source of substantially high voltage for reducing the ionization time. The advantages for this type connection are more fully described and claimed in co-pending application entitled, "Pulse Forming Circuit," by the same inventors, Serial Number 104,464, and assigned to the same common assignee as the present invention. In this drawing there is shown an impedance 10 connected at one end to ground 11 and at the other end to a cathode 12 of thyratron 13. The input triggering signal to the thyratron 13 is directed to a screen grid 14 of the thyratron 13 through a conventional coupling capacitor 15. The screen grid 14 is negatively biased through resistor 16 to prevent the thyratron from conducting in the absence of an input triggering signal. A control grid **16*a* in the thyratron 13 is connected to a substantially high positive voltage for improving the time response of the thyratron. The high voltage supply is connected through a suitable limiting resistor 17 to an anode 18 of the thyratron 13. A first energy storage means such as a variable capacitor 19 is connected at one end to the anode 18 and at the other end to a ground 20 to thereby effectively place the capacitor 19 across the output when the thyratron 13 is conducting. A second energy storage means such as capacitor 21 is connected at one end to the anode 18 of thyratron 13 and at the other end to an impedance 22 that is connected to ground 20. The series combination of capacitor 21 and impedance 22 is effectively placed across the output when the thyratron 13** is conducting.

A delay generator in the form of a series resonant circuit consisting of coil 23 and capacitor 24 is connected at one end to the anode 18 of thyratron 13 and at the opposite end to a junction of a coupling capacitor 25 and a cathode 26 of a thyratron 27. The thyratron 27 is connected as a diode and contains a screen grid 28, an anode 29 and a control grid **29*a* that are all connected to ground as at point 30. Externally connecting the cathode 26 and the screen grid 28 of the thyratron 27 is a substantially high impedance 31**.

The other end of coupling capacitor 25 is connected to a screen grid 32 of a thyratron 33. The screen grid 32 is negatively biased to prevent conduction of the thyratron 33 in the absence of a positive going signal being fed through the coupling capacitor 25. Thyratron 33 contains an anode 34 connected to the junction of the cathode 12 of the thyratron 13 and the impedance 10. A cathode 35 of the thyratron 33 is connected to ground at point 36 and a control grid **34*a* is connected to a substantially high positive voltage. The firing of the thyratron 33 is relatively independent of the voltage on the anode 34 due to the substantially high positive voltage connected to the control grid 34*a***.

Connected across impedance 10 is a suitable clipping means **36*a* such as a Zener diode. The ouptut signal is obtained across the impedance 10 and an external load impedance illustrated by capacitor 37**.

The operation of the disclosed circuit is best understood by first assuming a quiescent condition during which the capacitor 19, the capacitor 21, and the capacitor 24 have been charged to the B supply voltage. With the introduction of a triggering signal to the screen grid 14 of the thyratron 13, the thyratron will fire quickly due to the positive voltage on control grid **16*a*. The capacitor 19 discharges through the thyratron 13 and the parallel combination of impedance 10, the diode 36*a*, and the external load impedance 37. The discharging of capacitor 19 produces a fast, low impedance rise of voltage at the output terminals. Simultaneously capacitor 21 similarly discharges but at a slower controlled rate due to resistor 22**.

The fast rising voltage across the output quickly reaches the breakdown potential of the Zener diode 36*a* which then conducts and limits the output signal to a desired value. The conduction of thyratron 13 establishes a discharge path for capacitor 24 by placing a high voltage across thyratron 27 in the forward direction sufficient to break down thyratron 27. It will be noted that thyratron 27 is connected as a diode. The conduction of thyratron 27 allows the series resonant circuit of coil 23 and capacitor 24 to oscillate for one-half cycle, thereby providing the basic pulse shape for the output signal.

The first current reversal of the oscillating signal is detected and used to generate a terminating signal that causes the thyratron tube 33 to fire which effectively shorts the output. As the oscillating current attempts to reverse, thyratron 27 ceases to conduct. As a result the voltage at the cathode 26 rises rapidly in a positive going direction. This sudden rise in voltage is coupled to the screen grid 32 of the thyratron 33 thereby causing the thyraton 33 to conduct, effectively short-circuiting the voltage across the output terminals.

A review of the circuit will show that both the leading and trailing edges are generated by the discharge of low impedance circuits 13. In addition the high voltage top of the pulse is maintained constant by the low dynamic impedance of the Zener diode.

The embodiment of the invention just described with the components listed below is capable of generating a 10 microsecond 400 volt pulse having rise and fall times of 10 nanoseconds with a capacitive load of 50 micro-microfarads.

| | |
|---|---|
| Thyratrons **13**, **27**, **33** | 2D21 tubes. |
| Impedance **22** | 10K. |
| Impedance **17** | 1 meg. |
| Impedance **31** | 10 meg. |
| Load impedance **10** | 10K. |
| Capacitor **24** | .015 microfarad. |
| Capacitor **21** | .05 microfarad. |
| Capacitor **19** | 5–50 micro-microfarads. |
| Coil **23** | 400–800 microhenrys. |
| Anode voltage for thyratron **13** | +1000 volts. |
| Screen grid bias voltage for thyratrons **13** and **33** | −75 volts. |
| Control grid voltage for thyratrons **13** and **33** | +800 volts. |
| Output signal voltage | +400 volts. |
| Diode **36** | 2-CR 101's in series. |
| Load capacitance **37** | 50 mmf. |

This completes the description of the particular embodiments of the invention illustrated herein. However, many modifications thereof will be apparent to persons skilled in the art without departing from the spirit and scope of this invention. Accordingly, it is desired that this invention not be limited by the particular details described herein, except as defined by the appended claims.

The embodiments of the invention in which an exclusive property or privilege is claimed are defined as follows:

1. A pulse generating circuit comprising a first low impedance switching means connected in series with a voltage clipping means, said first switching means being triggered by an input signal, said clipping means clipping said output signal to a desired voltage level, a first energy storage means having a substantially short time constant and connected in circuit with said first switching means for sustaining a first portion of said output signal at said clipped value, a second energy storage means having a substantially long time constant and connected in circuit with said first switching means for sustaining a second portion of said output signal at said clipped value, a delay generator connected in circuit with said first switching means for determining the pulse length of said clipped output signal, said delay generator comprising energy storage means for sustaining said output signal, and a second low impedance switching circuit connected in circuit with said delay generator for short-circuiting said clipping means thereby terminating said output signal.

2. A pulse generating circuit comprising a first low impedance switching means connected in series with a voltage clipping means, said first switching means being triggered by an input signal, said clipping means clipping said output signal to a desired voltage level, a first energy storage means having a substantially short time constant connected across said first switching means and said clipping means for sustaining a first portion of said output signal at said clipped value, a second energy storage means having a substantially long time constant connected across said first switching means and said clipping means for sustaining a second portion of said output signal at said clipped value, a delay generator responsive to said first low impedance switching means for generating a signal indicating the length of said clipped output signal, said delay generator comprising energy storage means for sustaining said output signal, and a second low impedance switching circuit responsive to said signal for short-circuiting said clipping means thereby terminating said output signal.

3. A pulse generating circuit comprising a first low impedance switching means connected in series with a voltage clipping means, said first switching means being triggered by an input signal, said clipping means clipping said output signal to a desired voltage level, a first energy storage means having a substantially short time constant and connected in circuit with said first switching means for sustaining a first portion of said output signal at said clipped value, a second energy storage means having a substantially long time constant and connected in circuit with said first switching means for sustaining a second portion of said output signal at said clipped value, a delay generator connecting said first switching means for generating a signal indicating the pulse length of said clipped output signal, said delay generator comprising energy storage means for sustaining said output signal, and a second low impedance switching circuit connected across said clipping means and responsive to said signal for short-circuiting said clipping means thereby terminating said output signal.

4. A pulse generating circuit comprising a first low impedance switching means connected in series with a voltage clipping means, said first switching means being triggered by an input signal, said clipping means clipping said output signal to a desired voltage level, a first energy storage means having a substantially short time constant and connected in circuit with said first switching means for sustaining a first portion of said output signal at said clipped value, a second energy storage means having a substantially long time constant and connected in circuit with said first switching means for sustaining a second portion of said output signal at said clipped value, a delay generator connecting said first low impedance switching means for generating a signal indicating the pulse length of said clipped output signal, said delay generator comprising energy storage means for sustaining said output signal, and a cutoff biased thyratron connected across said clipping means, said thyratron having a triggering element controlled by said signal generated by said delay generator for short-circuiting said clipping means thereby terminating said output signal.

5. A pulse generating circuit comprising a first low impedance switching means connected in series with a voltage clipping means, said first switching means being triggered by an input signal, said clipping means clipping said output signal to a desired voltage level, a first energy storage means having a substantially short time constant and connected in circuit with said first switching means for sustaining a first portion of said output signal at said clipped value, a second energy storage means having a substantially long time constant and connected in circuit with said first switching means for sustaining a second portion of said output signal at said clipped value, a resonant circuit connected in circuit with said first low impedance switching means for causing said resonant circuit to oscillate, detecting means responsive to a current reversal of said oscillating resonant circuit for generating a terminating signal, said resonant circuit comprising energy storage means for sustaining said output signal, and a second low impedance switching circuit responsive to said terminating signal for short-circuiting said clipping means thereby terminating said output signal.

6. A pulse generating circuit comprising a first low impedance switching means connected in series with a voltage clipping means, said first switching means being triggered by an input signal, said clipping means clipping said output signal to a desired voltage level, a first energy storage means havng a substantially short time constant and connected in circuit with said first switching means for sustaining a first portion of said output signal at said clipped value, a second energy storage means having a substantially long time constant and connected in circuit with said first switching means for sustaining a second portion of said output signal at said clipped value, a resonant circuit connected in series with said clipping means said first switching means and a detecting means, said resonant circuit being connected in circuit with said first switching means for causing said resonant circuit to generate an oscillating signal in a direction to sustain the main portion of said output signal at said clipped value, said detecting means being responsive to a current reversal of said oscillating signal for generating a terminating signal, and a second low impedance switching circuit responsive to said terminating signal for short-circuiting said clipping means thereby terminating said output signal.

7. A pulse generating circuit comprising a first low impedance switching means connected in series with a voltage clipping means, said first switching means being triggered by an input signal, said clipping means clipping said output signal to a desired voltage level, a first energy storage means having a substantially short time constant and connected in circuit with said first switching means for sustaining a first portion of said output signal at said clipped value, a second energy storage means having a substantially long time constant and connected in circuit with said first switching means for sustaining a second portion of said output signal at said clipped value, a resonant circuit connected in series with said clipping means said first switching means and a detecting means, said resonant circuit being connected in circuit with said first switching means for causing said resonant circuit to generate an oscillating signal in a direction to sustain the main portion of said output signal at said clipped value, means for controlling the pulse width of said output signal by controlling the resonant frequency of said resonant circuit, said detecting means being responsive to a current reversal of said oscillating signal for generating a terminating signal, and a second low impedance switching circuit responsive to said terminating signal for short-circuiting said clipping means thereby terminating said output signal.

8. A pulse generating circuit comprising a first low impedance switching means connected in series with a voltage clipping means, said first switching means being triggered by an input signal, said clipping means clipping said output signal to a desired voltage level, a first energy storage means having a substantially short time constant and connected in circuit with said first switching means for sustaining a first portion of said output signal at said clipped value, a second energy storage means having a substantially long time constant and connected in circuit with said first switching means for sustaining a second portion of said output signal at said clipped value, a resonant circuit connected in series with said first switching means, said clipping means and a diode detecting means, said resonant circuit being connected in circuit with said first switching means for causing said resonant circuit to generate an oscillating signal in a direction to sustain the main portion of said output signal at said clipped value, said diode detecting means having at least an anode and a cathode connected in series with said resonant circuit in a direction to conduct only during the first half cycle of said oscillating signal, the current reversal of said oscillating circuit resulting in a substantially high positive voltage on said cathode with respect to said anode, and a second low impedance switching circuit responsive to said positive voltage on said cathode for short-circuiting said clipping means thereby terminating said output signal.

9. A pulse generating circuit comprising a first low impedance switching means connected in series with a voltage clipping means, said first switching means being triggered by an input signal, said clipping means clipping said output signal to a desired voltage level, a first capacitor circuit being charged to a voltage substantially higher than said clipped output signal, said first capacitor circuit having a substantially short time constant connected across said clipping means and said first switching means for sustaining a first portion of said output signal at said clipped value, a second capacitor circuit being charged to a voltage substantially higher than said clipped output signal, said second capacitor circuit having a substantially long time constant connected across said clipping means and said first switching means for sustaining a second portion of said output signal at said clipped value, a series resonant LC circuit connected in series with said first switching means, said clipping means and a diode detecting means, said series resonant capacitor being charged to a voltage substantially higher than said clipped output signal, said resonant circuit being connected in circuit with said first switching means for causing said resonant circuit to generate an oscillating signal in a direction to sustain the main portion of said output signal at said clipped value, said diode detecting means having at least an anode and a cathode connected in series with said resonant circuit in a direction to conduct only during the first half of said oscillating signal, the current reversal of said oscillating circuit resulting in a substantially high positive voltage on said cathode with respect to said anode, and a second low impedance switching circuit responsive to said positive voltage on said cathode for short-circuiting said clipping means thereby terminating said output signal.

10. A pulse generating circuit comprising a thyratron having a control grid, a screen grid, a cathode and an anode, said anode being connected to a substantially high positive operating potential, said cathode being connected to a clipping means for generating an output signal across said clipping means when said thyratron fires, said control grid being connected to a substantially high positive voltage, said screen grid being negatively biased for preventing conduction between said cathode and said anode, said screen grid being triggered by an input signal for firing said thyratron, said clipping means clipping said output signal to a desired voltage level, a first energy storage means having a substantially short time constant connected in circuit with said thyratron for sustaining a first portion of said output signal at said clipped value, a second energy storage means having a substantially long time constant connected in circuit with said thyratron for sustaining a second portion of said output signal at said clipped value, a delay generator connected in circuit with said thyratron for generating a terminating signal indicating the pulse length of said clipped output signal, said resonant circuit comprising energy storage means for sustaining said output signal, and a second low impedance switching circuit responsive to said terminating signal for short-circuiting said clipping means thereby terminating said output signal.

11. A pulse generating circuit comprising a first low impedance switching means connected in series with a voltage clipping means, said first switching means being triggered by an input signal, said clipping means clipping said output signal to a desired voltage level, a first energy storage means having a substantially short time constant and connected in circuit with said first switching means for sustaining a first portion of said output signal at said clipped value, a second energy storage means having a substantially long time constant and connected in circuit with said first switching means for sustaining a second portion of said output signal at said clipped value, a delay generator connected in circuit with said first switching means for generating a terminating signal indicating the pulse length of said clipped output signal, said delay generator comprising energy storage means for sustaining said output signal, and a thyratron tube having a control grid, a screen grid, a cathode and an anode, said anode being connected to the positive voltage side of said clipping means, said cathode being connected to the negative voltage side of said clipping means, said control grid being connected to a substantially high positive voltage, said screen grid being negatively biased for preventing conduction between said cathode and said anode and controlled by said terminating signal for firing said thyratron thereby short-circuiting said clipping means and cutting off said output signal.

12. A pulse generating circuit comprising a first thyratron having a control grid, a screen grid, a cathode and an anode, said anode being connected to a substantially high positive operating potential, said cathode being connected to a clipping means for generating an output signal across said clipping means when said thyratron fires, said control grid being connected to a substantially high positive voltage, said screen grid being negatively biased for preventing conduction between said cathode and said anode, said screen grid being triggered by an input signal for firing said thyratron, said clipping means clipping said output signal to a desired voltage level, a first energy storage means having a substantially short time constant connected in circuit with said thyratron for sustaining a first portion of said output signal at said clipped value, a second energy storage means having a substantially long time constant connected in circuit with said thyratron for sustaining a second portion of said output signal at said clipped value, a delay generator connected in circuit with said first thyratron for generating a terminating signal indicating the pulse length of said clipped output signal, said delay generator comprising energy storage means for sustaining said output signal, and a second thyratron having a control grid, a screen grid, a cathode and an anode, said anode being connected to the positive voltage side of said clipping means, said cathode being connected to the negative voltage side of said clipping means, said control grid being connected to a substantially high positive voltage, said screen grid being negatively biased for preventing conduction between said cathode and said anode and controlled by said terminating signal for firing said second thyratron thereby short-circuiting said clipping means and terminating said output signal.

13. A first pulse generating circuit comprising a first thyratron having a control grid, a screen grid, a cathode and an anode, said anode being connected to a substantially high positive operating potential, said cathode being connected to a clipping means for generating an output signal across said clipping means when said thyratron fires, said control grid being connected to a substantially high positive voltage, said screen grid being negatively biased for preventing conduction between said cathode and said anode, said screen grid being triggered by an input signal for firing said thyratron, said clipping means clipping said output signal to a desired voltage level, a first energy storage means having a substantially short time constant connected in circuit with said thyratron for sustaining a first portion of said output signal at said clipped value, a second energy storage means having a substantially long time constant connected in circuit with said thyratron for sustaining a second portion of said output signal at said clipped value, a series resonant LC circuit connected in series with said first thyratron, said clipping means and a diode detecting means, said resonant circuit being connected in circuit with said first thyratron for causing said resonant circuit to generate an oscillating signal in a direction to sustain the main portion of said output signal at said clipped value, means for controlling the pulse width of said output signal by controlling the resonant frequency of said resonant circuit, said diode detecting means responsive to the current reversal of said oscillating signal for generating a terminating signal, a second thyratron having a control grid, a screen grid, a cathode and an anode, said anode being connected to the positive voltage side of said clipping means, said cathode being connected to the negative voltage side of said clipping means, said control grid being connected to a substantially high positive voltage, said screen grid being negatively biased for preventing conduction between said cathode and said anode and controlled by said terminating signal for firing said second thyratron thereby short-circuiting said clipping means and terminating said output signal.

References Cited in the file of this patent

UNITED STATES PATENTS 2,496,543 Kanner ---------------- Feb. 7, 1950

OTHER REFERENCES

"Pulse and Digital Circuits" by Millman and Taub; McGraw-Hill Book Co., Inc., 1956, page 111.